C. T. EVANS.
MOTOR CONTROLLER.
APPLICATION FILED MAY 2, 1914.
1,214,663.
Patented Feb. 6, 1917.
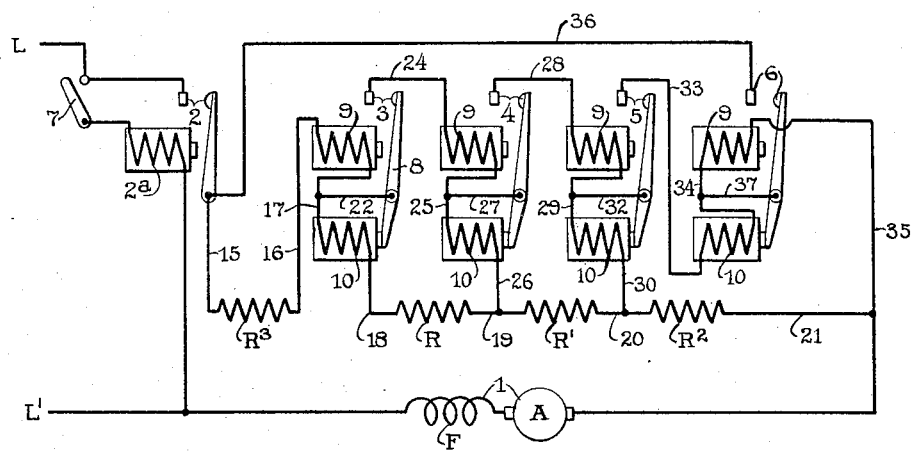
Witnesses
Inventor
Clarence T. Evans

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,214,663.   Specification of Letters Patent.   Patented Feb. 6, 1917.

Application filed May 2, 1914. Serial No. 835,944.

*To all whom it may concern:*

Be it known that I, CLARENCE T. EVANS, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to improvements in motor controllers.

It has heretofore been proposed to employ in motor controllers switches having two series coils, one to operate the same and the other to oppose operation thereof while abnormal conditions prevail in the motor circuit, and this invention has among its objects to provide an improved circuit arrangement for controllers employing such switches. It should be understood, however, that certain features of the invention may be applicable to controllers employing other types of switches.

The more specific objects and advantages of the invention will hereinafter appear.

The accompanying drawing diagrammatically illustrates the invention in its preferred form.

More specifically referring to the drawing, the same shows a controller adapted to a series motor 1. The motor has an armature A and a series field winding F and is controlled through series resistances R, R', R² and R³.

The controller includes magnetic switches 2, 3, 4, 5 and 6. The switch 2 controls the continuity of the motor circuit and has a shunt operating winding 2ª controlled by a manual switch 7. The switches 3, 4, 5 and 6 control the resistances R, R', R² and R³ respectively to automatically accelerate the motor and all are of the same type. Each is provided with a contact arm 8 and two series windings 9 and 10, the arrangement being such that the winding 9 attracts the upper end of the arm 8 to move the same to closed position while the winding 10 attracts the lower end of said arm to hold the same against operation while an abnormal current passes through said windings.

Briefly set forth, the connections are such that the switches 3, 4, 5 and 6 respond progressively and each upon responding short-circuits its respective resistance and also its respective restraining winding 10. Also the switch 6 upon responding short circuits the operating windings 9 of all of the preceding switches. Moreover, as will hereinafter appear, these connections are such as to render them extremely simple and adaptable to controllers varying in the number of switches employed.

The connections are as follows: When the switch 2 is closed circuit is completed from line L, through said switch, by conductor 15 through resistance R³, by conductor 16 through winding 9 of switch 3, by conductor 17 through winding 10 of switch 3, by conductor 18 through resistance R, by conductor 19 through resistance R', by conductor 20 through resistance R², by conductor 21 through the motor to line L'. Under such conditions, all of the resistances are included in the motor circuit together with both windings of the switch 3. Switch 3 responds subject to retardation by its winding 10 and upon closing short-circuits resistance R and its respective winding 10. Circuit then extends from conductor 17 by conductor 22 through switch 3, by conductor 24 through winding 9 of switch 4, by conductor 25 through winding 10, by conductor 26 to conductor 19 and thence through resistances R' and R² to the motor. Thus the motor is accelerated and both windings of the switch 4 included in circuit. Switch 4 responds subject to retardation by its winding 10 and upon closing short-circuits the resistance R' and its respective winding 10. Thereupon the motor circuit extends from conductor 25, by conductor 27 through said switch 4, by conductor 28 through the winding 9 of switch 5, by conductor 29 through the winding 10 of said switch, by conductor 30 to conductor 20 and thence through resistance R² to the motor. Again the motor is accelerated and both windings of switch 5 included in circuit therewith. Switch 5 responds, subject to retardation by its winding 10 and upon response short-circuits resistance R² and its respective winding 10. The motor circuit then extends from conductor 29 by conductor 32 through switch 5, by conductor 33 through winding 10 of switch 6, by conductor 34 through winding 9 of said switch, by conductor 35 to the motor. Thus is effected another step of acceleration and the inclusion in the motor circuit of both windings of switch 6. Switch 6 thereupon responds subject to retardation by its winding 10 and upon responding completes circuit from conductor 15 by conductor 36 through said switch by conductors 37 and 34 through its operating winding 9 by conductor 35 to the motor. Thus this switch upon responding excludes from the motor circuit the last step of resistance $R^3$ and moreover, excludes from circuit all of the windings 9 and 10 with the exception of its own winding 9. The motor is thus brought up to normal speed and its circuit maintained by the switch 2 and the single accelerating switch 6.

Considering now the individual switches, it will be observed that the windings 9 and 10 of each are connected directly one to the other with an intermediate connection to the pivot point of the switch arm. Further, considering the other connections of switches 4 and 5, it will be found that the same are alike in both instances, each of said switches having its winding 9 directly connected with the stationary contact of the next preceding switches and having its winding 10 connected to a point between its respective resistance and the next preceding resistance.

Thus it will be apparent that any desired number of additional switches of precisely the same type may be embodied in the controller with the same connections as switches 4 and 5. Also it will be apparent that as the switches 4 and 5 are representative of all switches between the first and last switches of the sequence, the general scheme of connections may be resolved into three standard sets of connections. First, the connections of the first accelerating switch which include the connection between the main line switch and the winding 9 of said accelerating switch and the connection of the last step of starting resistance between said two switches. Second, the above discussed connections for each of the intermediate set of switches represented by the switches 4 and 5. Third, the connections for the last switch of the sequence including the connection of its stationary contact to the main line switch, the connection of its operating winding to one side of the motor circuit and the connection of its restraining winding to the contact of the next preceding switch.

What I claim as new and desire to secure by Letters Patent is:—

1. A motor controller provided with a plurality of electromagnetic accelerating switches, said switches having separate series operating and lockout windings and each but the last upon responding including in series with its own operating winding the windings of the next succeeding switch and connections whereby said last switch upon responding excludes from circuit the windings of the preceding switches.

2. A motor controller provided with a plurality of accelerating switches to operate in a definite sequence, an operating winding and an opposing restraining winding for each of said switches and connections whereby the last switch of the sequence excludes from circuit the windings of all of the preceding switches.

3. A motor controller provided with a plurality of accelerating switches to operate in a definite sequence, an operating winding and a restraining winding for each of said switches and connections whereby the last switch of the sequence excludes from circuit the windings of all of the preceding switches and its own restraining winding.

4. A motor controller provided with a plurality of switches to operate in a definite sequence, an operating winding and a restraining winding for each of said switches and connections whereby each of said switches, upon responding, excludes from circuit its restraining winding and whereby one of said switches, upon responding, also excludes from circuit the operating windings of the preceding switches.

5. A motor controller provided with a plurality of accelerating switches to operate in a definite sequence, a set of series of windings for each switch including an operating winding and a lockout winding and connections providing for sequential operation of said switches and for excluding from circuit upon response of the last switch of the sequence the windings of the preceding switches.

6. A motor controller provided with a plurality of accelerating switches each having a series operating winding and a series lockout winding and connections for said windings controlled by said switches to insure progressive operation of said switches, each of said switches upon responding excluding from circuit its lockout winding and the last switch of the sequence excluding from circuit the operating windings of all preceding switches.

7. A motor controller provided with a plurality of electromagnetic accelerating switches, each of said switches having a series operating winding and a series lockout winding, inter-connections between said switches insuring progressive operation thereof, said inter-connections for all switches between the first and last of the sequence being identical and connections controlled by the last switch of the sequence for excluding from circuit the operating windings of all preceding switches.

8. In a motor controller, in combination, a plurality of series resistances, a plurality of control switches therefor, each having two series windings, one for operating and the other for restraining operation of the same and connections whereby each switch, upon response, excludes from circuit its respective resistance and restraining winding and whereby one of said switches upon responding, also excludes from circuit the operating windings of all previously operated switches.

9. In a motor controller, in combination, a plurality of series resistances, a plurality of control switches therefor, each having two series windings, one for operating and the other for restraining operation of the same and connections whereby each switch, upon response, excludes from circuit its respective resistance and restraining winding and whereby one of said switches upon responding, also excludes from circuit the operating windings of all previously operated switches, said connections being identical for all switches intermediate of the first and last of the sequence.

10. A motor controller provided with a main switch, a plurality of progressively operated accelerating switches each having series operating and restraining windings and a resistance section to be controlled by each of said accelerating switches, the resistance section of the last switch of the sequence being connected between the main switch and the first operated accelerating switch.

11. A motor controller provided with a main switch, a plurality of progressively operated accelerating switches each having series operating and restraining windings and a resistance section to be controlled by each of said accelerating switches, the resistance section of the last switch of the sequence being connected in circuit with the operating winding of the first operated accelerating switch at a point between said last mentioned switch and said main switch.

12. A motor controller provided with a main switch, a plurality of progressively operated accelerating switches each having series operating and restraining windings and a resistance section to be controlled by each of said accelerating switches, the resistance section of the last switch of the sequence being connected in circuit with the operating winding of the first operated accelerating switch at a point between the restraining winding of the same switch and said main switch.

In witness whereof, I have hereunto subscribed my name in the presence of two witnesses.

CLARENCE T. EVANS.

Witnesses:
TEKLA BOST,
L. A. WATSON.

Copies of this patent may be obtained for five cents each, by addressing the "Commissioner of Patents, Washington, D. C."